United States Patent [19]

Shoji et al.

[11] Patent Number: 4,780,654
[45] Date of Patent: Oct. 25, 1988

[54] CONTROL APPARATUS FOR DRILLING MACHINE

[75] Inventors: Michihiro Shoji; Toshio Mikiya, both of Tokyo, Japan

[73] Assignee: Nitto Kohki Co., Ltd., Tokyo, Japan

[21] Appl. No.: 82,340

[22] Filed: Aug. 6, 1987

[30] Foreign Application Priority Data

Feb. 21, 1986 [JP] Japan .................................. 61-35025
Feb. 21, 1986 [JP] Japan .................................. 61-35026

[51] Int. Cl.$^4$ ............................................. H02H 7/085
[52] U.S. Cl. .................................. 318/434; 318/345 D;
318/345 H; 408/8; 408/14
[58] Field of Search ........... 318/434, 432, 433, 345 D,
318/345 H; 408/5–11, 14–16, 76; 361/23, 30, 31

[56] References Cited

U.S. PATENT DOCUMENTS

| 4,524,309 | 6/1985 | Hisatake et al. | 318/434 |
| 4,559,577 | 12/1985 | Shoji et al. | 318/434 |
| 4,604,006 | 0/1986 | Shoji et al. | 408/76 |

*Primary Examiner*—David Smith, Jr.
*Attorney, Agent, or Firm*—Nixon & Vanderhye

[57] ABSTRACT

A drilling machine comprises an electric drill having a drill motor for rotating an annular drilling tool and a feed control motor for moving the annular drilling tool forward and backward with respect to a workpiece, both connected to an AC power source, and an electromagnetic base for fixing the electric drill on an object to be drilled. A control apparatus for the drilling machine comprises a switching element for controlling a power supply timing of an AC power to the feed control motor, a detector for detecting a load current of the drill motor, a sawtooth signal generator synchronized with each of positive and negative half cycles of the AC power source, a first pulse generator synchronized with the negative half cycle of the AC power source, a second pulse generator synchronized with the sawtooth wave signal, a duty ratio of the second pulse increasing as the load of the drill motor decreases, a third pulse generator synchronized with the sawtooth wave signal, a duty ratio of the third pulse increasing as the time passes from activation of the drill motor, an OR gate for obtaining a logical sum of the first and third pulses, an AND gate for obtaining a logical product of the first and second pulses, the output of the AND gate controlling the switching timing of the switching element.

16 Claims, 6 Drawing Sheets

CONTROL APPARATUS FOR DRILLING MACHINE

BACKGROUND OF THE INVENTION

The present invention relates to a control apparatus for a drilling machine and, more particularly, to a portable control apparatus for a drilling machine which includes an electric drill having an electromagnetic base (electromagnet unit) at its lower portion for fixing the electric drill on a workpiece and a drilling tool, e.g., an annular drilling tool; and a motor (to be referred to as a feed motor hereinafter) for feed-control of the electric drill.

As is well known, electric drills are classified into two types, i.e., one using an annular drilling tool and the other using a twist drill. An electric drill having an annular drilling tool can provide a larger torque and has a higher cutting capacity than the one having a twist drill. On the other hand, an abnormally large load may act on the annular drilling tool, so that the annular drilling tool is sometimes damaged or the electric drill is burned.

Therefore, when an operator operates the electric drill with the annular drilling tool, he must always pay careful attention so as not to cause a large load to act on the annular drilling tool.

However, only an extremely skilled operator can recognize the magnitude of the load, i.e., determine whether a proper load acts on an edge of the annular drilling tool or too large or too small a load acts thereon.

When an unskilled operator operates a drilling machine, the annular drilling tool may be damaged or the electric drill may be burned as described above. In an extreme case, the electric drill itself may be rotated about the distal end of the annular drilling tool.

In addition, a power source of the drilling machine is preferably turned off immediately after completion of drilling to save power consumption and to prevent damage to the annular drilling tool. However, according to a conventional drilling machine, an operator must recognize completion of drilling and then turn off a power source switch, resulting in a cumbersome operation for an operator and poor operability.

In order to eliminate the above drawbacks, the present inventors have made various researches and developments, and have already filed Japanese Patent Application Nos. 56-186473, 57-23741, and 59-252697. The U.S. Patent Application corresponding to Japanese Patent Application Nos. 56-186473 and 57-23741 was issued on Aug. 5, 1986 as U.S. Pat. No. 4,604,006.

An invention disclosed in U.S. Pat. No. 4,604,006 includes a feed motor for moving an electric drill toward a workpiece, and a detector is provided to a control circuit of the electric drill to detect the magnitude of a load of the electric drill on the basis of a current flowing therethrough. When a detection output reaches a first preset level, the detector auomatically stops feed of the electric drill to decrease the load. When the detector detects a decrease in the load, it starts feed of the electric drill again, thereby intermittently driving the feed motor. In addition, when the detection output reaches a second preset level, it automatically stops both rotation and feed of the electric drill. When the detector detects that drilling is completed, it also automatically stops both rotation and feed of the electric drill.

An invention disclosed in Japanese Patent Application No. 59-252697 includes a first detector for stopping rotation of a feed motor when a load current flowing through a drill motor exceeds a first threshold value and a second detector for stopping rotation of the drill motor when the load current exceeds a second threshold value, and further includes a controller for intermittently stopping the rotation of the feed motor when the load current is less than the first threshold value. As a result, removal of a built-up edge formed on the tool and discharge of chips can be easily performed, thereby preventing a large load from abruptly acting on the electric drill.

However, the above conventional techniques have the following problems.

(1) When a feed motor is intermittently driven, drilling efficiency is decreased.

(2) Rotation speed of a feed motor and hence feed speed of an electric drill are conventionally set at substantially constant values. Especially when a workpiece has a high-hardness layer called a "mill scale" on its surface, penetration of a drill is poor in an initial drilling period. As a result, drilling positioning may be inaccurate or offset, or in an extreme case, a drilling machine itself may be rotated.

SUMMARY OF THE INVENTION

It is, therefore, an object of the present invention to provide a control apparatus for a drilling machine which can prevent damage to a drilling tool, burning of a drilling machine, and rotation of a drilling machine itself about the distal end of the drilling tool without decreasing drilling efficiency.

It is another object of the present invention to provide a control apparatus for a drilling machine in which a drilling tool can be reliably penetrated in a high-hardness layer on a surface of a workpiece and hence drilling positioning can be accurately performed.

It is still another object of the present invention to provide a control apparatus for a drilling machine in which diameters of a drilling tool can be arbitrarily selected in a wide range.

It is still another object of the present invention to provide a control apparatus for a drilling machine which can be easily operated even by an unskilled operator to safely drill a large hole with high efficiency.

In order to solve the above problems, the present invention is characterized by the following arrangement. That is, immediately after an electric drill is started, i.e., in an initial drilling period, a feed motor is driven by an AC half wave to be set in a low speed feed state when the electric drill moves forward by a predetermined distance or during a predetermined time interval after start-of an operation. After the initial period, an operation gradually transits to feed motor driving by an AC full wave. Meahwhile, a load current flowing through a drill motor is detected, and a drive current of the feed motor is feed back-controlled in accordance with the magnitude of a detected load signal. hen the load signal increases and exceeds a second upper limit, both the feed and drill motors are emergency stopped. When drilling is finally completed, no load acts on the drill motor. After it is detected that the load signal abruptly decreases, both the feed and drill motors are stopped.

The present invention is also characterized by the following arrangement. That is, the load current flowing through the drill motor is detected, and the drive current of the feed motor is feed back-controlled in accordance with the magnitude of the detected load signal. When the load signal exceeds a first upper limit, the feed motor is switched to half wave driving to be set in a low speed feed state. When the load signal further increases and exceeds the second upper limit, both the feed and drill motors are emergency stopped. When drilling is finally completed, no load acts on the drill motor. After it is detected that the load signal abruptly decreases, both the feed and drill motors are stopped.

DETAILED DESCRIPTION OF THE PREFERRED EMBODIMENT

Figure 3:
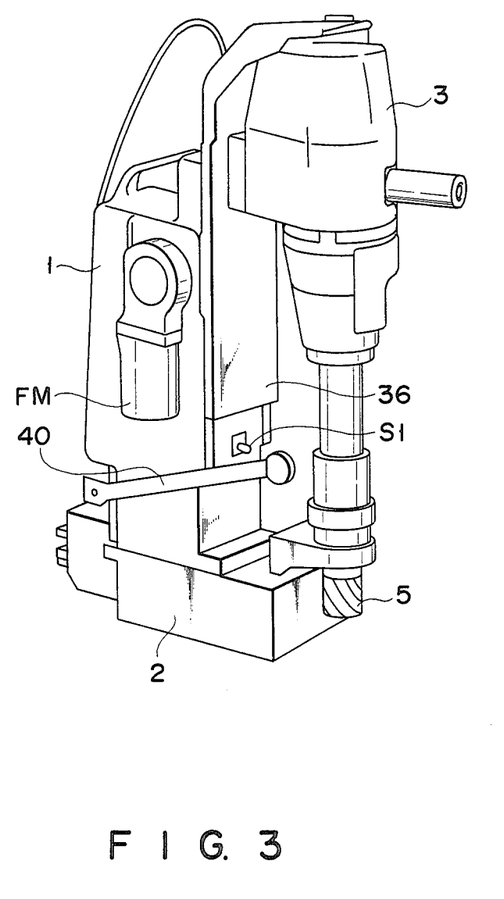
FIG. 3 is a schematic perspective view showing an overall arrangement of a mechanism to which the present invention is suitably applied.

The present invention will be described in detail with reference to the accompanying drawings. FIG. 3 is a schematic perspective view showing an overall arrangement of a drilling machine according to an embodiment of the present invention, and FIG. 4 is a right side view thereof.

Figure 4:
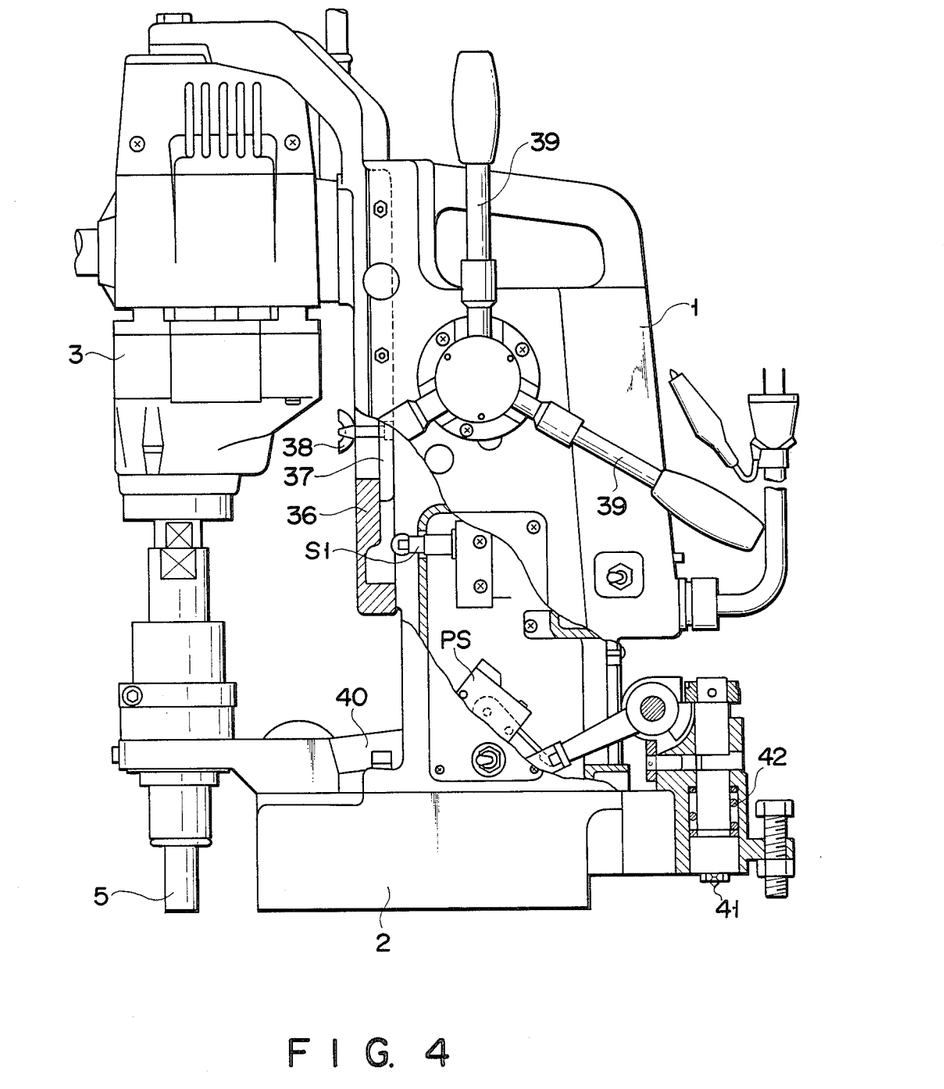
FIG. 4 is a right side view of the mechanism shown in FIG. 3.

In FIGS. 3 and 4, reference numeral 1 denotes a frame; 2, an electromagnetic base (including electromagnet) mounted at the lower portion of frame 1 to fix an electric drill at a workpiece (not shown); 3, an electric drill mounted at the front portion of frame 1 to be manually or electrically lifted; FM; a feed motor for electrically lifting drill 3; and 5, an annular drilling tool mounted at an arbor of drill 3.

Reference numeral 39 denotes a manual lifting handle for manually feeding drill 3, which rotates about shaft 39a to lift drill 3; and 36, a sliding plate fixed to drill 3.

Switch board 37 is fixed on plate 36 by wing screw 38. Board 37 moves as drill 3 moves downward. When drill 3 moves down to a predetermined position (at which drilling is completed), board 37 operates limit switch S1 (to be described later with reference to FIG. 1).

Reference numeral 40 denotes an operation handle for operating two-stroke power switch PS and turns on contacts 0, 1, and 2 (see FIG. 1) of switch PS in a predetermined order.

An operation controller (shown in FIGS. 1A to 1C) which constitutes a main part of the present invention is incorporated in frame 1. During positioning of drill 3, punch 41 is moved downward instantaneously by a biasing force of spring 42 to pierce the surface of a workpiece and to prevent the shift of the workpiece when power switch PS is switched to a second position, and reliably performs positioning together with an attracting force of base 2 to be described later.

Figure 1A:
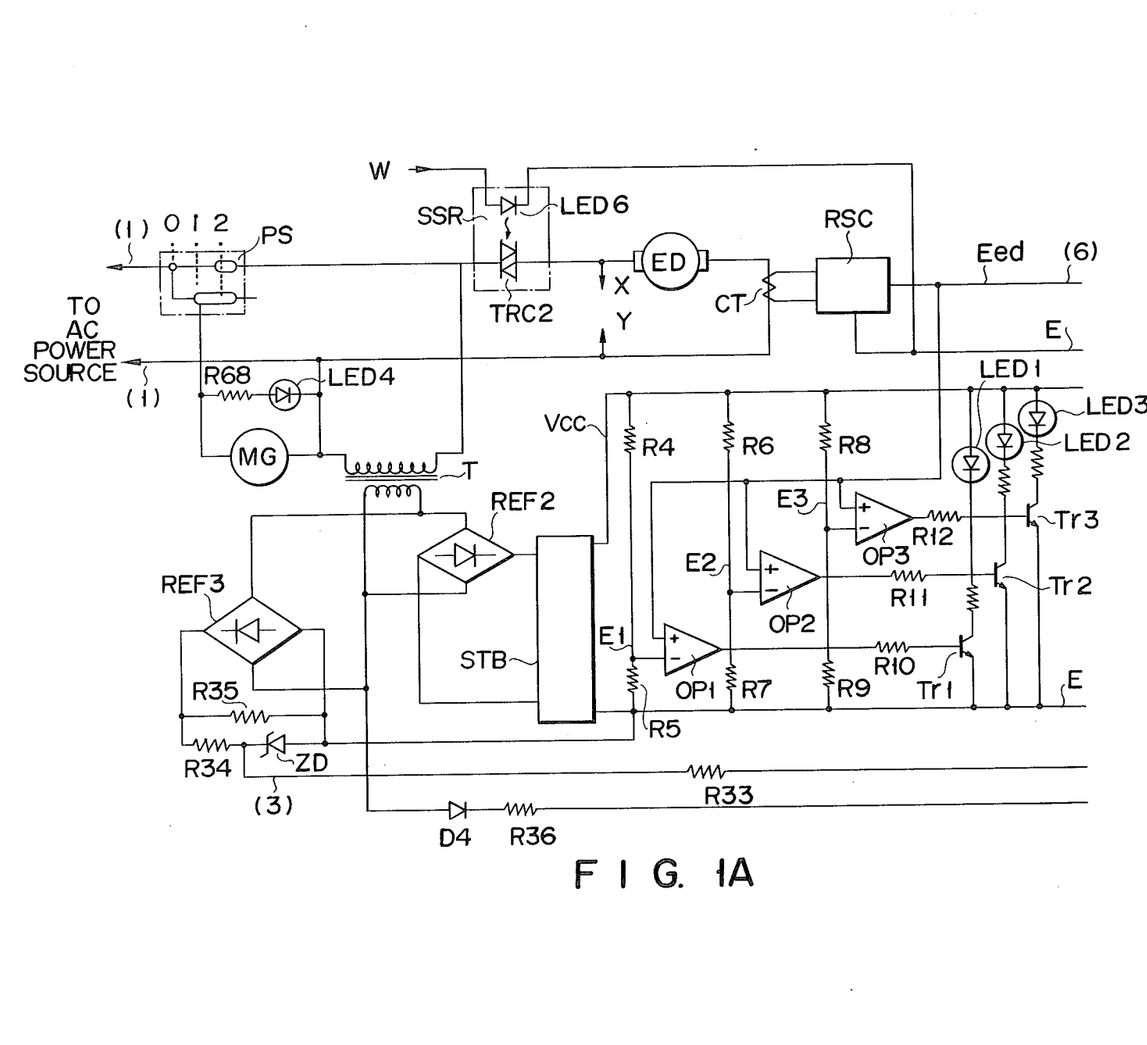
FIGS. 1A to 1C are block diagrams of an embodiment of the present invention.
Figure 1B:
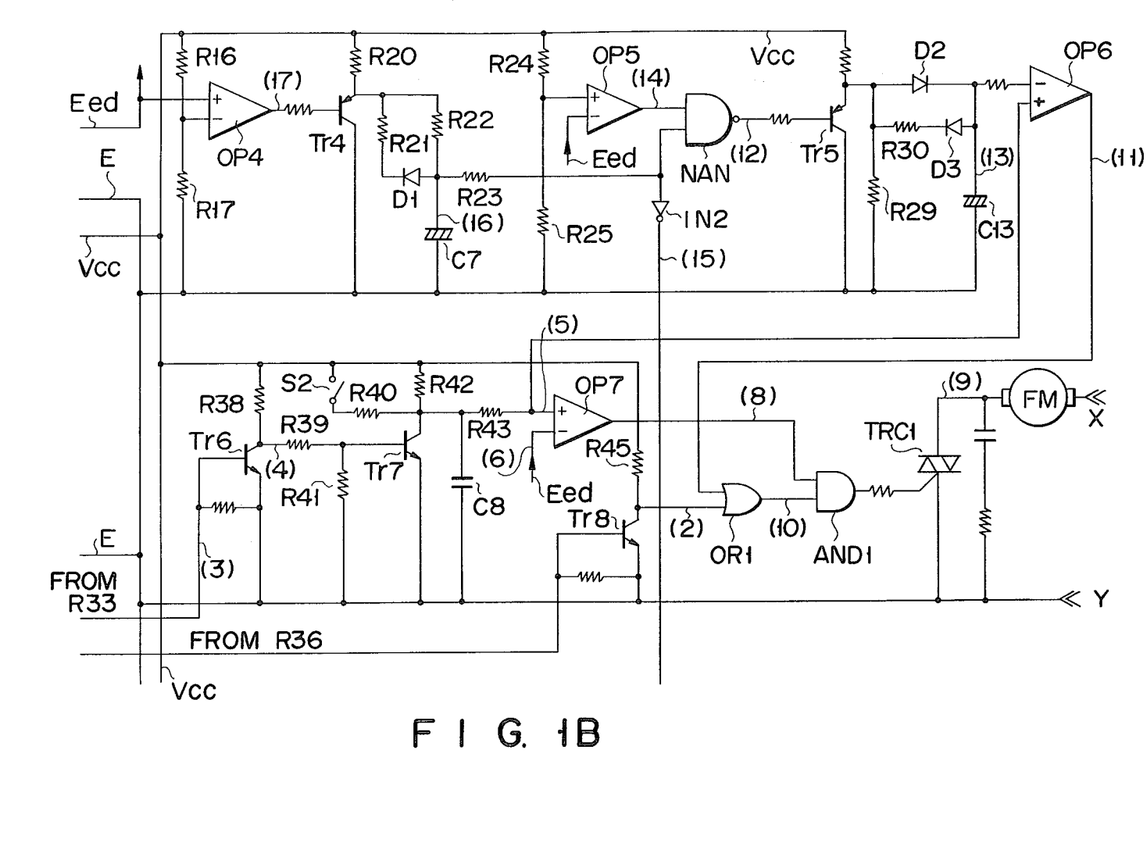
Figure 1C:
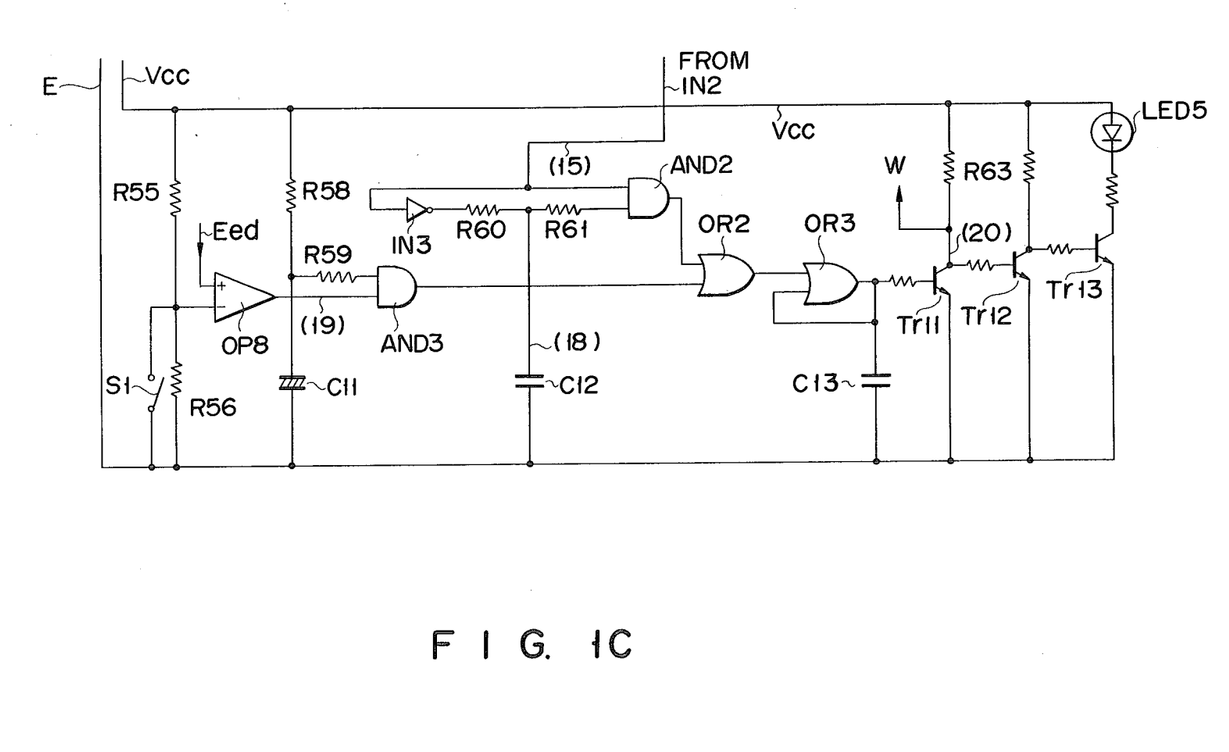
Figure 2:
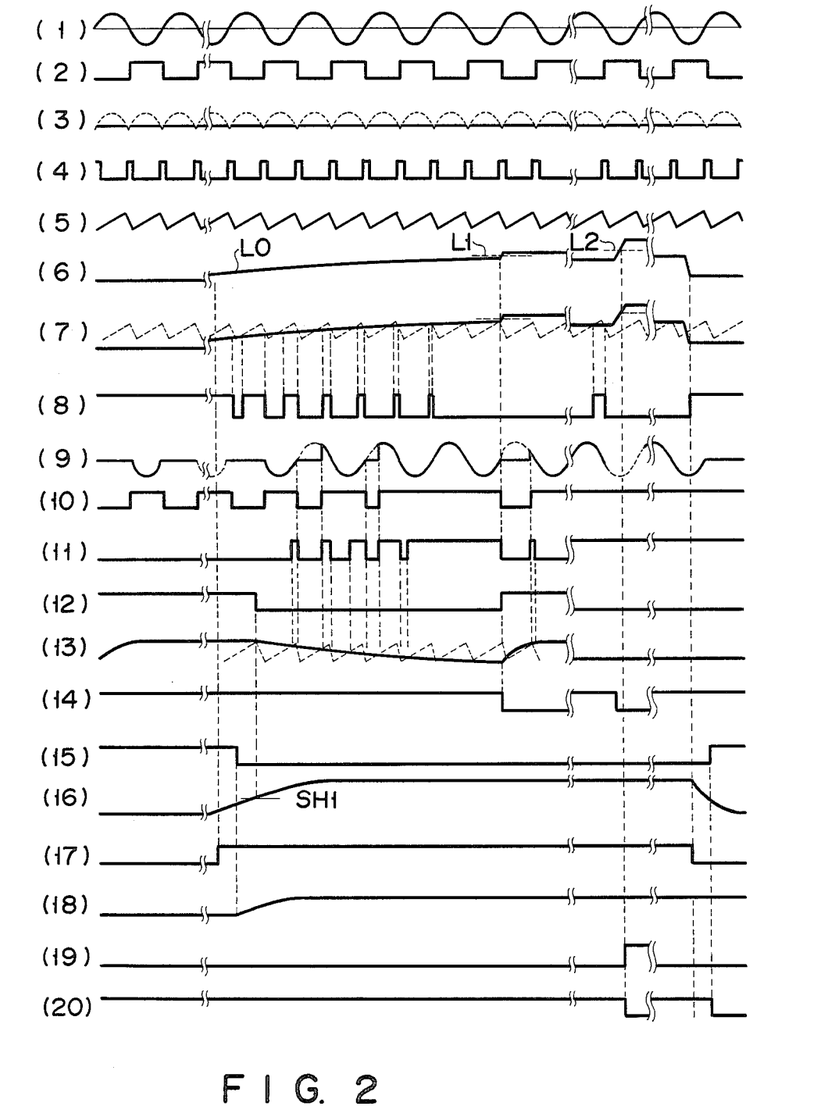
FIG. 2 is a timing chart for explaining an operation of the embodiment shown in FIG. 1.

FIGS. 1A to 1C are block diagrams of an embodiment of the present invention, and FIG. 2 is a timing chart for explaining an operation thereof. Referring to FIGS. 1A to 1C and FIG. 2, an operation will be described for each step of drilling process.

A. Half Wave Feed Control of Feed Motor Immediately after Operation Start

When switch PS is in position "0", all power sources are shut off, and the control apparatus for a drilling machine shown in FIG. 1 is in a nonoperative state.

When switch PS is set in position "1", electromagnet MG is energized, and base 2 of drill 3 attracts a workpiece, thereby performing positioning. At the same time, light-emitting diode LED4 emits light to display completion of positioning.

When switch PS is set in position "2", an AC power source voltage (waveform (1) in FIG. 2) is applied to a primary winding of transformer T, and rectifiers REF2 and REF3 operate to generate DC voltages.

A DC output from rectifier REF2 is adjusted to be a constant voltage by voltage stabilizer STB and becomes control voltage Vcc. Voltage Vcc is applied to resistor R63 and transistor Tr11.

As will be described in detail later, since a base potential of transistor Tr11, i.e., an output from OR gate OR3 or a charged voltage of capacitor C13 is at low level, transistor Tr11 is in an OFF state, and its collector potential (waveform (20) in FIG. 2) substantially equals voltage Vcc.

Therefore, voltage Vcc is applied to light-emitting diode LED6 of relay SSR, and diode LED6 emits light. This light is radiated on triac TRC2 to turn on relay SSR. As a result, drill motor ED is energized and starts rotation. Rotation of motor ED (rotation of tool 5) is constant.

A secondary voltage of transformer T is half wave-rectified by diode D4 and applied to the base of transistor Tr8 through resistor R36.

Therefore, transistor Tr8 is turned on at every AC half cycle, and its collector generates a pulse (positive pulse) synchronized with the AC half wave (negative half wave) as shown by waveform (2) in FIG. 2. The pulse is supplied to one input terminal of OR gate OR1.

Note that at this time, operation amplifier OP6 does not generate any output (waveform (11)) as will be described later. For this reason, OR gate OR1 directly outputs a collector signal (waveform (2)) of transistor Tr8 synchronized with the AC half wave, as shown by waveform (10) in FIG. 2.

On the other hand, the secondary voltage of transformer T is full wave-rectified by rectifier REF3, and a rectified output is supplied to a series circuit of resistor R34 and Zener diode ZD. Therefore, a pulse-like voltage obtained by clipping the full wave-rectified waveform at a predetermined level as shown by waveform (3) in FIG. 2 is generated across diode ZD and applied to the base of transistor Tr6 through resistor R33.

Since transistor Tr6 is turned on in a period except for near a zero crossing point of AC waveform (1) in FIG. 2, its collector potential goes to high level near the zero crossing point and goes to low level in the remaining period, as shown by waveform (4) in FIG. 2.

Contrary to transistor Tr6, transistor Tr7 is turned on near the zero crossing point of waveform (1). Therefore, its collector potential goes to high level in a period except for near the zero crossing point and goes to low level near the zero crossing point.

While the collector of transistor Tr7 is at high level, capacitor C8 is charged by a time constant of C8·R42. When transistor Tr7 is turned on, capacitor C8 is discharged by a very short time constant through transistor Tr7.

Therefore, a charged voltage of capacitor C8, i.e., an input voltage to the noninverting input terminal of operation amplifier OP7 changes to be a sawtooth waveform as shown by a solid line of waveform (5) in FIG. 2.

The load current flowing through drill motor ED is detected by current transformer CT and rectifier smoothing circuit RSC, and load signal Eed is generated (waveform (6)).

Immediately after motor ED is energized, no load acts on motor ED and signal Eed is sufficiently small. Therefore, as shown by waveform (7), the noninverting input terminal (sawtooth wave signal shown by waveform (5)) becomes higher in level than the inverting input terminal (load signal Eed shown by waveform (6)), its high level output, as shown by waveform (8), is supplied to AND gate AND1.

Therefore, AND gate AND1 generates the same output as the output from gate OR1, i.e., the collector potential of transistor Tr8 shown by waveform (2) in FIG. 2, and this output is supplied to the gate of triac TRC1.

As described above, since feed motor FM is driven by the half wave of the AC waveform as shown by waveform (9), drill 3 is fed at a relatively low speed. Therefore, when drill 3 is moved forward by a predetermined distance, tool 5 of drill 3 reaches the surface of a workpiece, and drilling is started by slowly cutting a high-hardness portion, i.e., the so-called mill scale.

When drilling starts, the load current of motor ED gradually increases, and signal Eed rises, as shown by waveform (6).

Therefore, as shown by waveform (8), amplifier OP7 generates a low level output when the level of the sawtooth wave signal supplied to its noninverting input terminal is lower than that of signal Eed. Amplifier OP7 generates a high level output when the sawtooth wave signal exceeds signal Eed.

As is apparent from FIG. 2, as for timing at which the high level output is generated in a cycle of the sawtooth wave, i.e., a cycle of each AC half wave, the lower signal Eed is, the earlier the timing becomes, and the higher signal Eed is, the later the timing is.

For this reason, as for timing at wiich gate AND1 is enabled by the high level output from amplifier OP7, i.e., triac TRC1 is triggered and the AC voltage is applied to motor FM, the lower signal Eed is, the earlier the timing becomes, and the higher signal Eed is, the later the timing becomes.

Therefore, the smaller the load acting on motor ED is, the higher the feed speed of drill 3 becomes, and the larger the load is, the lower the feed speed becomes.

Signal Eed is also supplied to the noninverting input terminal of operation amplifier OP4 and is compared with a reference value obtained by dividing Vcc by resistors R16 and R17.

Since the load is small immediately after motor ED is energized, signal Eed is small. An output from amplifier OP4 goes to low level as shown by waveform (17), and transistor Tr4 is turned on so that its collector goes to low level.

Therefore, capacitor C7 is not charged. That is, a terminal voltage of capacitor C7 goes to low level as shown by waveform (16), and an output from inverter IN2 goes to high level as shown by waveform (15). The output from inverter IN2 is supplied to inverter IN3 and AND gate AND2 as its first input.

Since a low level signal inverted by inverter IN3 is supplied to AND gate AND2 as its second input, an output from AND gate AND2 goes to low level. Outputs from OR gates OR2 and OR3 maintain low level so as not to turn on transistor Tr11, so that relay SSR continues operation. A collector output from transistor Tr11 is shown by waveform (20). Thus, motors ED and FM are kept driven by the half wave of the AC waveform.

B. Transition from Low Speed Feed to Normal Feed Control of Motor FM

Since the low level charged voltage of capacitor C7 shown by waveform (16) is also applied to one terminal of NAND gate NAN, an output from NAND gate NAN goes to high level as shown by waveform (12), and transistor Tr5 is turned off. At this time, a potential of the collector of transistor Tr5 is at high level, and capacitor C13 is charged through diode D2 as shown by waveform (13). For this reason, an output from amplifier OP6 is at low level as shown by waveform (11), thereby not affecting the output from OR gate OR1. As a result, an output (waveform (10)) from gate OR1 is a collector waveform of transistor Tr8 shown by waveform (2).

When the load of motor ED increases and signal Eed further rises to exceed reference voltage L0 (shown by waveform (6)) obtained by dividing voltage Vcc by resistors R16 and R17, an output from amplifier OP4 is inverted to go to high level as shown by waveform (17), and transistor Tr4 is turned off. The collector of transistor Tr4 goes to high level, and capacitor C7 is charged through resistors R20 and R22 so that its terminal voltage increases as shown by waveform (16). As a result, an output from inverter IN2 goes to low level as shown by waveform (15), and an output from inverter IN3 goes to high level. Thus, capacitor C12 starts to be charged through resistor R60 as shown by waveform (18). However, since the output from inverter IN2 is at low level, the output from AND gate AND2 does not change, and a state of the circuit after OR gate OR2 does not change.

On the other hand, the terminal voltage of capacitor C7 which gradually increases as described above is applied to one input terminal of NAND gate NAN. At this time, since an output from amplifier OP5 does not change and maintains high level to be described later, when the terminal voltage of capacitor C7 increases up to a given value (SH1) (see waveform (16) in FIG. 2), the output from NAND gate NAN is inverted to go to low level as shown by waveform (12). For this reason, transistor Tr5 is turned on, and the charge of capacitor C13 is discharged through diode D3, resistor R30, and transistor Tr5, as shown by waveform (13). Note that the discharge time constant at that time is selected to be an extremely large value.

A sawtooth wave voltage (waveform (5) and a dot line of waveform (13) in FIG. 2) generated across the terminals of capacitor C8 is applied to the noninverting terminal of amplifier OP6, and a terminal voltage (a solid line of waveform (13) in FIG. 2) of capacitor C13 is applied to its inverting terminal.

Therefore, as shown by waveform (11) in FIG. 2, the output from amplifier OP6 goes to high level while the terminal voltage of capacitor C13 is smaller than the sawtooth voltage of capacitor C8.

As a result, the output from amplifier OP6 becomes a pulse waveform, the leading edge of which is advanced (becomes earlier) as the terminal voltage of capacitor C13 decreases in one cycle of the sawtooth wave. This high level output is supplied to gate OR1 and superposed on the half wave output from transistor Tr8. Thus, a time interval in which the output from OR gate OR1 is at high level is gradually increased and finally the output always maintains high level (see waveform (10)).

The superposed waveform is applied to triac TRC1 through AND gate AND1 to turn it on. Therefore, motor FM gradually transits from low speed feed driven by the half wave to normal high speed feed driven by the full wave. When the potential of capacitor C13 is sufficiently low, the output from amplifier OP6 is substantially always at high level, so that motor FM is completely in a full wave driving state (normal feeding state).

Note that in FIG. 1, rectifier REF3, diode ZD, transistors Tr6 and Tr7, capacitor C8, and associated resistors constitute a sawtooth wave voltage generator. However, as is apparent to those skilled in the art, these elements can be replaced with other suitable circuit elements and arrangements.

In addition, the same sawtooth wave signal as that supplied to the noninverting input terminal of amplifier OP7 is supplied to the noninverting input terminal of amplifier OP6. However, an intermittent sawtooth wave signal generated at the collector of transistor Tr8 only while a pulse wave signal corresponding to the AC half wave is at low level may be supplied thereto. That is, amplifier OP6 need only generate a pulse which turns on OR gate OR1 during a negative interval of the collector output pulse of transistor Tr8 shown by waveform (2).

C. Automatic Control during Normal Feed

A voltage of node between resistors R24 and R25 is applied as first overload reference voltage L1 to the noninverting input terminal of amplifier OP5. Voltage L1 is set to be smaller than second overload reference voltage L2 for overload (emergency) all stop control to be described later by a predetermined value.

During drilling of a workpiece, when a large load acts on motor ED for some reason and signal Eed exceeds voltage L1, the output from amplifier OP5 is inverted to be low level as shown by waveform (14), and the output from NAND gate NAN goes to high level as shown by waveform (12). Then, transistor Tr5 is turned off.

Since transistor Tr5 is turned off, capacitor C13 is charged by an extremely short time constant (see waveform (13)). As the terminal voltage of capacitor C13 increases, a time interval in which amplifier OP6 generates the high level output decreases as shown by waveform (11), as is apparent from the above description.

In other words, a duty ratio of the pulse generated from amplifier OP6 decreases, its leading edge phase delays, and ultimately no pulse is generated. Therefore, a drive current of motor FM becomes closely similar to the half wave, and the feed speed of drill 3 decreases.

As described above, when motor FM is driven by the full wave, control is performed in accordance with the load of motor ED. That is, when the load is large, the feed speed is low because a trigger phase of triac TRC1 is delayed. When the trigger phase is delayed most, the low speed feed driven by the half wave is performed. On the contrary, when the load is small, the feed speed is high because the trigger phase of triac TRC1 is advanced.

D. All Stop Control during Overload

A voltage of node between resistors R55 and R56 is applied as voltage L2 to the inverting input terminal of amplifier OP8 (see waveform (6)). When the load of motor ED increases beyond the limit and signal Eed exceeds voltage L2, the output from amplifier OP8 is inverted to be high level as shown by waveform (19).

When this high level signal is supplied to the base of transistor Tr11 through AND gate AND3 and OR gates OR2 and OR3, transistor Tr11 is turned on and its collector potential decreases to be low level as shown by waveform (20). For this reason, relay SSR is deenergized, and both motors ED and FM are stopped.

Note that since a large lash current generally flows when a motor is activated and signal Eed at that time may exceed voltage L2, the above all stop control must be inhibited at activation.

For this reason, a time constant (integration) circuit consisting of resistor R58 and capacitor C11, and AND gate AND3 are provided at the output side of amplifier OP8.

As soon as switch PS is set to position "2" and the motor is activated, capacitor C11 is charged by voltage Vcc through transistor R58. However, since the terminal voltage of capacitor C11 is below a predetermined value during a predetermined time interval after activation, AND gate AND3 is disabled.

Therefore, even if signal Eed becomes extremely large at activation and amplifier OP8 generates a high level output, this output does not affect transistor Tr11 through AND gate AND3 or OR gates OR2 and OR3.

When the predetermined time has passed, the terminal voltage of capacitor C11 increases and AND gate AND3 is enabled. The output from amplifier OP8 is not inhibited and normal overload protection of motor ED is performed.

Switch S1, connected so as to short-circuit resistor R56 connected to the inverting input terminal of amplifier OP8, is a limit switch which is closed regardless of completion/incompletion of drilling when drill 3 moves toward the workpiece to the limit.

When switch S1 is closed, the output from amplifier OP8 operates in the same manner as that in the case of overload, so that motors ED and FM are both stopped.

E. All Stop Control at Completion of Drilling

When drilling of the workpiece is completed, substantially no load acts on motor ED, and signal Eed abruptly decreases.

Therefore, the output from amplifier OP4 goes to low lvel as shown by waveform (17), transistor Tr4 is turned on, and capacitor C7 is discharged through diode D1, resistor R21, and transistor Tr4, as shown by waveform (16). Thereafter, the output from inverter IN2 is inverted to high level as shown by waveform (15) and is transmitted to one input terminal of AND gate AND2.

At this time, since capacitor C12 is charged as described above as shown by waveform (18) and its terminal voltage is at high level, the output from AND gate AND2 goes to high level, and this signal is supplied to the base of transistor Tr11 through OR gates OR2 and OR3 to turn it on.

Therefore, the collector of transistor Tr11 goes to low level as shown by waveform (20), light-emitting diode LED6 no longer emits light, and relay SSR is turned off. Both motors ED and FM are stopped.

Since the output from OR gate OR3 is fed back to its input, OR gate OR3 is self-held and its output maintains high level.

Note that light-emitting diode LED5, connected to a collector/emitter circuit of transistor Tr13, is a display lamp for indicating that relay SSR is not operated, i.e., motors ED and FM are stopped, and emits light when motors ED and FM are stopped.

Note that completion of drilling can also be detected by monitoring that the differential value of signal Eed exceeds a predetermined negative value. Therefore, it is obvious that this detection output may be used instead of the output from AND gate AND2.

F. Display of Load

Signal Eed is also supplied to the noninverting input terminals of respective amplifiers OP1 to OP3, and reference voltages E1 to E3 are applied to this inverting input terminals.

Assuming that a relation $E1 < E2 < E3$ is established among voltages E1 to E3, when the load of motor ED is smallest, amplifier OP1 generates an output, corresponding transistor Tr1 is turned on, and diode LED1 emits light.

As the load gradually increases, amplifiers OP2 and OP3 sequentially generate outputs, and light-emitting diodes LED2 and LED3 sequentially emit light. Therefore, by observing light emission of diodes LED1 to LED3, the small, normal, or large load state of motor ED can be determined.

The description has been made with reference to the case wherein the present invention is carried out by a hard logic combining individual logic elements. However, as is obvious to those skilled in the art, the present invention can be carried out by a soft logic (software) using a computer.

As has been described above, according to the present invention, the following effects can be achieved.

(1) Since the feed motor is driven by a half wave when drilling is started and a feed speed of an electric drill is very low, a drilling tool reliably penetrates in a high-hardness portion (mill scale) on the surface of a workpiece. Therefore, drilling is performed with high accuracy, and rotation of a drilling machine itself caused by an overload does not occur.

(2) Since driving control of the feed motor is gradually switched from a half wave to a full wave and the feed speed increases, drilling can be performed with maximum efficiency according to a performance of the electric drill.

(3) Since optimum feed speed control according to the load of the drill motor is realized, size (diameter) of an annular drilling tool can be selected in a wide range.

(4) Since optimum and maximum feed speed control according to the load of the drill motor is realized throughout the drilling process, maximum operation efficiency can be realized without rotation of the drilling machine itself and the like. Therefore, using a relatively small drill motor, drilling with a high load, i.e., drilling of a large diameter can be safely performed with high efficiency.

What is claimed is:

1. A control apparatus for a drilling machine including an electric drill having a drill motor and a feed control motor both connected to an AC power source, and an electromagnetic base for fixing said electric drill on an object to be drilled, comprising:
   switching means for controlling a power supply timing of an AC power from said AC power source to said feed control motor;
   detecting means for detecting a load of said drill motor and generating a load signal of a level corresponding to a detected load;
   signal generating means for generating a sawtooth wave signal synchronized with a cycle of said AC power source and having a frequency twice a frequency of said AC power source;
   first pulse generating means for generating a first pulse signal synchronized with a cycle of said AC power source and having a frequency equal to a frequency of said AC power source;
   second pulse generating means for generating a second pulse signal synchronized with the sawtooth wave signal and in accordance with the load signal, a duty ratio of the second pulse increasing as a level of the load signal decreases; and
   controlling means for controlling a switching timing of said switching means in accordance with a logical product of the first and second pulse signals and controlling the AC power supplied to said feed control motor.

2. An apparatus according to claim 1, in which
said second pulse generating means comprises means for generating a second pulse signal, a duty ratio of which approaches 1 as the level of the load signal decreases and approaches 0 as the level increases.

3. An apparatus according to claim 2, in which
said second pulse generating means comprises means for generating a second pulse signal, a timing of a leading edge of which is early as the level of the load signal decreases and is delayed as the level increases.

4. An apparatus according to claim 3, in which
said second pulse generating means comprises means for comparing the load signal with the sawtooth wave signal.

5. A control apparatus for a drilling machine including an electric drill having a drill motor and a feed control motor both connected to an AC power source, and an electromagnetic base for fixing said electric drill on an object to be drilled, comprising:
   switching means for controlling a power supply timing of an AC power from said AC power source to said feed control motor;
   detecting means for detecting a load of said drill motor and generating a load signal of a level corresponding to a detected load;
   signal generating means for generating a sawtooth wave signal synchronized with a cycle of said AC power source and having a frequency twice a frequency of said AC power source;
   first pulse generating means for generating a first pulse signal synchronized with a first half period of a cycle of said AC power source and having a frequency equal to a frequency of said AC power source;
   second pulse generating means for generating a second pulse signal synchronized with the sawtooth wave signal according to the load signal, a duty ratio of the second pulse signal increasing as the level of the load signal decreases;
   third pulse generating means for generating a third pulse signal synchronized with a second half period of the cycle of said AC power source, a duty ratio of the third pulse signal increasing as time passes from a start of activation of said drill motor;
   logical sum means for obtaining a logical sum signal of the first and third pulse signals; and controlling means for controlling a switching timing of said switching means in accordance with a logical product of an output from said logical sum means and the second pulse signal and controlling the AC power supplied to said feed control motor.

6. An apparatus according to claim 5, in which
said second pulse generating means comprises means for generating a second pulse signal, a duty ratio of which approaches 1 as the level of the load signal decreases and approaches 0 as the level increases, and
said third pulse generating means comprises means for generating a third pulse signal, a duty ratio of which is near 0 upon activation of said drill motor and approaches 1 as time passes from a start of the activation of said drill motor.

7. An apparatus according to claim 6, in which
said second pulse generating means comprises means for generating a second pulse signal, a timing of a leading edge of which is early as the level of the load signal decreases and is delayed as the level increases, and
said third pulse generating means comprises means for generating a third pulse signal, a timing of a leading edge of which is early at time near a start of activation of said drill motor and is delayed as time passes from the start of the activation of said drill motor.

8. An apparatus according to claim 7, in which
said second pulse generating means comprises means for comparing the load signal with the sawtooth wave signal, and said third pulse generating means comprises means for comparing a signal, a level of which gradually changes from a start of activation of said drill motor, with the sawtooth wave signal.

9. A control apparatus for a drilling machine including an electric drill having a drill motor and a feed control motor both connected to an AC power source, and an electromagnetic base for fixing said electric drill on an object to be drilled, comprising:
switching means for controlling a power supply timing of an AC power from said AC power source to said feed control motor;
detecting means for detecting a load of said drill motor and generating a load signal of a level corresponding to a detected load;
signal generating means for generating a sawtooth wave signal synchronized with a cycle of said AC power source and having a frequency twice a frequency of said AC power source;
first pulse generating means for generating a first pulse signal synchronized with a first half of a cycle of said AC power source and having a frequency equal to a frequency of said AC power source;
second pulse generating means for generating a second pulse signal synchronized with a second half of the cycle of said AC power source, a duty ratio of the second pulse signal increasing as time passes from a start of activation of said drill motor;
first controlling means for controlling a switching timing of said switching means in accordance with a logical product of the first and second pulse signals and controlling the AC power supplied to said feed control motor; and
second controlling means for controlling said second pulse generating means to decrease a duty ratio of the second pulse signal when the level of the load signal becomes larger than a first predetermined value.

10. An apparatus according to claim 9, in which
said first pulse generating means comprises means for generating a first pulse signal, a duty ratio of which approaches 1 as the level of the load signal decreases and is near 0 as the level increases, and
said second pulse generating means comprises means for generating a second pulse signal, a duty ratio of which is near 0 upon activation of said drill motor and approaches 1 as time passes from a start of the activation of said drill motor.

11. An apparatus according to claim 10, in which
said first pulse generating means comprises means for generating a first pulse signal, a timing of a leading edge of which is early as the level of the load signal decreases and is delayed as the level increases, and
said second pulse generating means comprises means for generating a second pulse signal, a timing of a leading edge of which is early at time near a start of activation of said drill motor and is delayed as time passes from the start of activation.

12. An apparatus according to claim 11, in which
said first pulse generating means comprises means for comparing the load signal with the sawtooth wave signal, and
said second pulse generating means comprises means for comparing a signal, a level of which gradually changes from a start of activation of said drill motor, with the sawtooth wave signal.

13. A control apparatus for a drilling machine including an electric drill having a drill motor and a feed control motor both connected to an AC power source, and an electromagnetic base for fixing said electric drill on an object to be drilled, comprising:
switching means for controlling a power supply timing of an AC power from said AC power source to said feed control motor;
detecting means for detecting a load of said drill motor and generating a load signal of a level corresponding to a detected load;
signal generating means for generating a sawtooth wave signal synchronized with each of first and second halves of a cycle of said AC power source;
first pulse generating means for generating a first pulse signal synchronized with the first half of the cycle of said AC power source and in accordance with the load signal, a duty ratio of the first pulse signal increasing as the level of the load signal decreases;
second pulse generating means for generating a second pulse signal synchronized with the second half of the cycle of said AC power source, a duty ratio of the second pulse signal increasing as time passes from a start of activation of said drill motor;
first controlling means for controlling a switching timing of said switching means in accordance with a logical product of the first and second pulse signals and controlling the AC power source supplied to said feed control motor;
second controlling means for decreasing the duty ratio of the second pulse signal when the level of the load signal becomes larger than a first predetermined value; and
means for stopping supply of the AC power to said drill motor and said feed control motor when the level of the load signal becomes larger than a second predetermined value larger than the first predetermined value.

14. An apparatus according to claim 13, in which
said first pulse generating means comprises means for generating a first pulse signal, a duty ratio of which approaches 1 as the level of the load signal decreases and approaches 0 as the level increases, and
said second pulse generating means comprises means for generating a second pulse signal, a duty ratio of which is near 0 upon activation of said drill motor and approaches 1 as time passes from a start of the activation of said drill motor.

15. An apparatus according to claim 14, in which
said first pulse generating means comprises means for generating a first pulse signal, a timing of a leading edge of which is early as the level of the load signal decreases and is delayed as the level increases, and
said second pulse generating means comprises means for generating a second pulse signal, a timing of a leading edge of which is early at time near a start of activation of said drill motor and is delayed as time passes from the start of the activation of said drill motor.

16. An apparatus accoring to claim 15, in which
said first pulse generating means comprises means for comparing the load signal with the sawtooth wave signal, and
said second pulse generating means comprises means for comparing a signal, a level of which gradually changes from a start of activation of said drill motor, with the sawtooth wave signal.

* * * * *

UNITED STATES PATENT AND TRADEMARK OFFICE
CERTIFICATE OF CORRECTION

PATENT NO. : 4,780,654

DATED : October 25, 1988

INVENTOR(S) : SHOJI et al

It is certified that error appears in the above-identified patent and that said Letters Patent is hereby corrected as shown below:

ON THE TITLE PAGE:

under "[30] Foreign Application Priority Data", delete

"Feb. 21, 1986 [JP]  Japan..............61-35025
Feb. 21, 1986 [JP]  Japan..............61-35026"

Signed and Sealed this

Nineteenth Day of December, 1989

*Attest:*

JEFFREY M. SAMUELS

*Attesting Officer*   *Acting Commissioner of Patents and Trademarks*